US011053026B2

(12) United States Patent
Martres (10) Patent No.: US 11,053,026 B2
(45) Date of Patent: Jul. 6, 2021

(54) TOOL AND METHOD FOR INSPECTING THE QUALITY OF ASSEMBLIES OF STRUCTURAL ELEMENTS OF AIRCRAFT

(71) Applicant: Airbus Operations SAS, Toulouse (FR)

(72) Inventor: Jean-luc Martres, Saint-Jory (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 296 days.

(21) Appl. No.: 16/251,865

(22) Filed: Jan. 18, 2019

(65) Prior Publication Data

US 2019/0233137 A1 Aug. 1, 2019

(30) Foreign Application Priority Data

Jan. 30, 2018 (FR) ...................................... 1850747

(51) Int. Cl.
| | | |
|---|---|---|
| *B64F 5/60* | (2017.01) | |
| *G01B 5/06* | (2006.01) | |
| *G01B 5/00* | (2006.01) | |
| *F16B 5/02* | (2006.01) | |

(52) U.S. Cl.
CPC .............. *B64F 5/60* (2017.01); *G01B 5/0025* (2013.01); *G01B 5/061* (2013.01); *F16B 5/02* (2013.01)

(58) Field of Classification Search
CPC .. B64F 5/60; G01B 5/06; G01B 5/061; G01B 5/02; G01B 3/30; G01B 7/02; G01B 7/06
USPC .................. 33/833, 832, 505, 1 BB
See application file for complete search history.

(56) References Cited

U.S. PATENT DOCUMENTS

| | | | | |
|---|---|---|---|---|
| 2,560,571 A | * | 7/1951 | Hawkins ................ | G01B 5/213 33/833 |
| 3,481,040 A | * | 12/1969 | Telford .................. | G01B 5/061 33/832 |
| 4,238,887 A | * | 12/1980 | McLaughlin .......... | G01B 5/061 33/822 |
| 4,458,422 A | * | 7/1984 | Nishikata ............... | G01B 5/061 33/534 |
| 4,577,412 A | * | 3/1986 | McKinney .............. | G01B 5/06 33/502 |

(Continued)

FOREIGN PATENT DOCUMENTS

| | | |
|---|---|---|
| DE | 102015226225 A1 | 6/2017 |
| EP | 0228563 A1 | 7/1987 |

OTHER PUBLICATIONS

French Search Report; priority document (dated Sep. 28, 2018).

*Primary Examiner* — Christopher W Fulton
(74) *Attorney, Agent, or Firm* — Greer, Burns & Crain, Ltd.

(57) ABSTRACT

A device and an inspection method for inspecting screw and nut assemblies in an aircraft, comprising a mechanical tool and a digital human-machine interface. The mechanical tool comprises a housing comprising a bearing surface defining a reference plane, a support beam mounted to be translationally mobile inside the housing, a linear encoder configured to measure, in use, a distance between the reference plane and a bottom face of the mobile support beam. The digital human-machine interface comprises a central unit, a display screen, an application and a database in which are stored validity ranges or standardized distances relating to types of assembly, the application and the database being loaded and operational in the central unit.

7 Claims, 5 Drawing Sheets

(56) References Cited

U.S. PATENT DOCUMENTS

| | | | | |
|---|---|---|---|---|
| 4,642,900 A * | 2/1987 | Provost | | G01B 5/18 33/567 |
| 4,679,326 A * | 7/1987 | Takizawa | | G01B 7/002 192/48.91 |
| 4,945,651 A | 8/1990 | Georg | | |
| 5,036,596 A * | 8/1991 | Gyoury | | B23Q 17/2216 33/636 |
| 5,040,309 A * | 8/1991 | Hayden | | B23Q 17/2225 33/833 |
| 5,491,907 A * | 2/1996 | Vidmar | | G01B 5/061 33/810 |
| 5,777,246 A | 7/1998 | Woods et al. | | |
| 6,131,302 A * | 10/2000 | Hohmann | | F16B 31/02 33/679.1 |
| 6,357,134 B1 * | 3/2002 | Hama | | G01B 5/061 33/703 |
| 6,401,352 B1 * | 6/2002 | Kimura | | G01B 5/061 33/703 |
| 6,467,184 B1 * | 10/2002 | Wust | | G01B 5/012 33/783 |
| 7,080,461 B2 * | 7/2006 | Jensen | | G01B 3/22 33/501.05 |
| 7,171,760 B1 * | 2/2007 | Lemon | | B23D 59/002 33/628 |
| 7,263,786 B1 * | 9/2007 | Zanier | | G01B 5/061 33/832 |
| 7,487,599 B1 * | 2/2009 | Spirito | | G01B 3/56 33/1 BB |
| 7,779,551 B2 * | 8/2010 | Zhang | | G01B 7/305 33/533 |
| 8,594,822 B2 | 11/2013 | McGuinn et al. | | |
| 9,057,593 B1 | 6/2015 | Wong et al. | | |
| 2006/0090363 A1 * | 5/2006 | Luner | | G01B 3/28 33/833 |
| 2006/0137204 A1 * | 6/2006 | Yang | | G01B 7/082 33/832 |
| 2007/0075192 A1 * | 4/2007 | Mian | | B61K 9/12 246/1 R |
| 2010/0287786 A1 * | 11/2010 | Biselx | | G01B 5/008 33/832 |
| 2011/0166824 A1 * | 7/2011 | Haisty | | G01B 5/12 702/157 |
| 2016/0061578 A1 * | 3/2016 | Zhang | | G01B 3/38 33/700 |
| 2018/0023945 A1 * | 1/2018 | Mariller | | G01B 5/14 33/832 |

* cited by examiner

TOOL AND METHOD FOR INSPECTING THE QUALITY OF ASSEMBLIES OF STRUCTURAL ELEMENTS OF AIRCRAFT

CROSS-REFERENCES TO RELATED APPLICATIONS

This application claims the benefit of the French patent application No. 1850747 filed on Jan. 30, 2018, the entire disclosures of which are incorporated herein by way of reference.

FIELD OF THE INVENTION

The invention relates to a tool and a method for inspecting the quality of assemblies of structural elements of aircraft by means of fixing sets of a screw-nut type.

BACKGROUND OF THE INVENTION

Figure 1A:
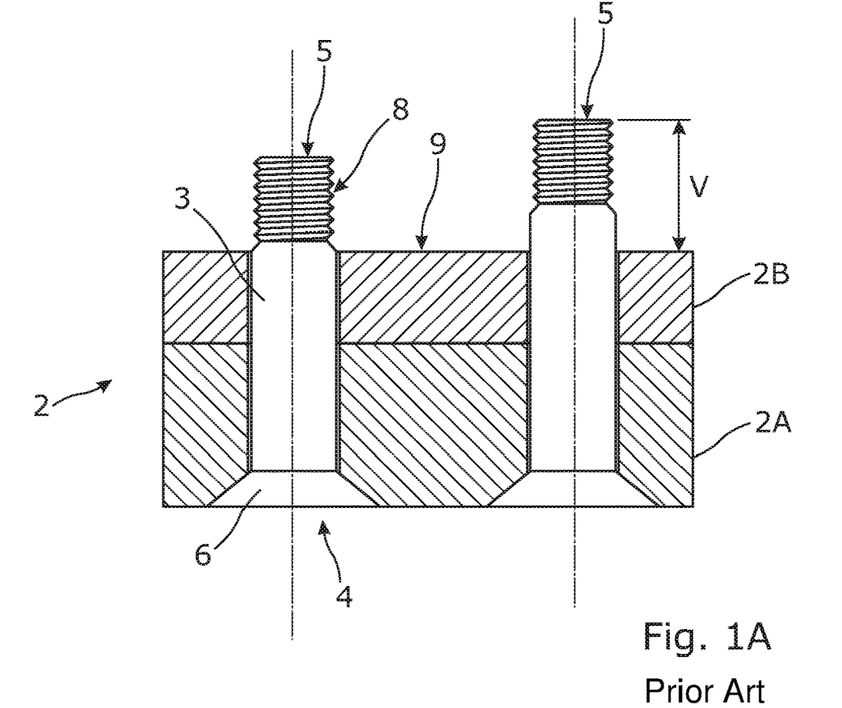
FIGS. 1A and 1B are axial cross sections of known assemblies of structural elements of aircraft by means of fixing sets of screw-nut type.
Figure 1B:
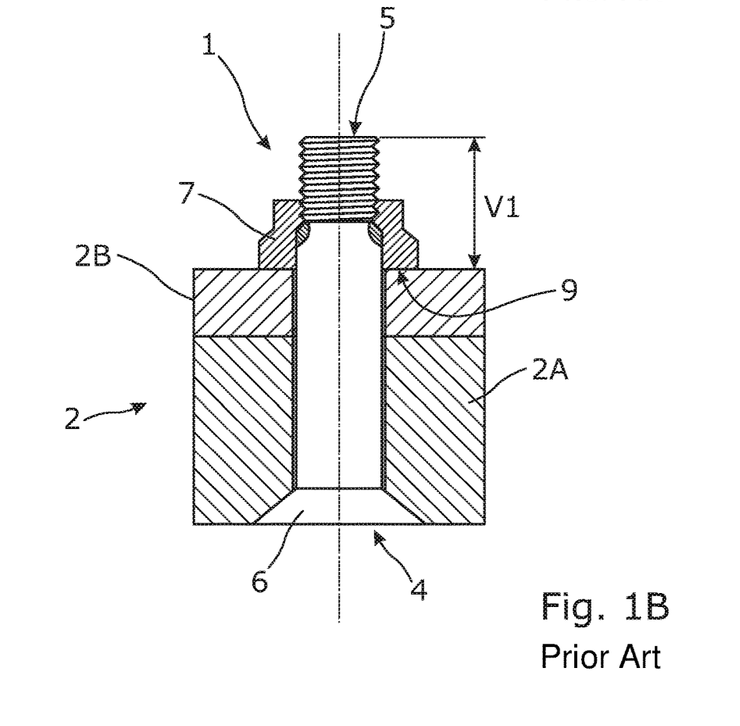

In relation to FIGS. 1A and 1B, an assembly 2 of at least two structural elements 2A, 2B (for example, plates) comprises a screw-nut fixing set 1 for fixing the two structural elements to one another. For each screw-nut set 1 of an assembly, the rod 3 of a threaded screw 4 is introduced by its free end 5 through respective coaxial orifices arranged in the structural elements 2A, 2B until the head 6 of the screw bears on a first structural element 2A. The nut 7 is then screwed onto a threaded portion 8 of the screw and tightened until it bears on a face, called contact face 9, of a second structural element 2B.

An assembly 2 exhibits a correct quality when several conditions are met:

the peening should be perfect (see FIG. 1A), which means that the assembled structural elements 2A and 2B should be entirely passed through by the stock 3 of the screw 4 and that the latter should be in complete contact with the elements passed through. This condition contributes to the shear strength of the assembly 2. This first condition imposes a minimum value, dependent on the characteristics of the screw (height of the threaded portion), called peening distance and denoted Dpeening, for a first distance V corresponding to the distance over which the screw extends beyond the assembled structural elements 2A, 2B. The distance V is therefore the distance measured, along the longitudinal axis of the screw 4, between the free end 5 and the bearing face 9. The first condition is written: V>Dpeening, the complete tightening of the nut 7 on the screw 4 should be guaranteed in order to ensure an adequate tightening of the structural elements 2A, 2B to one another. Contrary to the perfect peening, this second condition requires the nut 7 to be screwed over most of the height of the threaded portion 8 of the screw 4. More specifically, this second condition limits the distance over which the free end 5 extends beyond the nut 7. This second condition therefore defines a maximum value, denoted Dnut, for a second distance V1 measured along the longitudinal axis of the screw 4 between the free end 5 of the screw and the end of the nut in contact with the contact face 9. The second condition is written: V1<Dnut. It will be noted that the value Dnut is dependent on the dimensions of the screw 4 (height of the threaded portion), on the nut 7 (presence of a counter boring or not), and on the dimensions (in particular thicknesses) of the structural elements 2A, 2B passed through by the screw 4.

To check the quality of an assembly of structural elements of aircraft by means of a fixing set of screw-nut type, an operator will check the conformity of the distances V and V1. Several means exist for this.

An operator can, in particular, use metal gauges, that are simple and quick to use. There are two types of gauges: the T-shaped gauges, in which the height between the base of the T and one of the arms of the T supplies the value Dpeening and the height between the base of the T and the other arm of the T supplies the value Dnut, and the staircase gauges, in which the height between the base of the gauge and the first staircase tread supplies the value Dpeening and the height between the base of the gauge and the second staircase tread supplies the value Dnut.

The values Dpeening and Dnut depend on the screw and the nut used. The diversity of the screws and nuts that exist in the aeronautical field and of the possible associations between the various existing nuts and screws has led to the definition of several hundreds of different gauges. An additional difficulty stems from the fact that it is possible to add a washer between the nut and the structural elements to be assembled. Given the presence or not of a washer and the existence of two types of gauge (T or staircase), there are three inspection methods using metal gauges. These methods are illustrated in the attached FIGS. 2 to 4.

Figure 2:
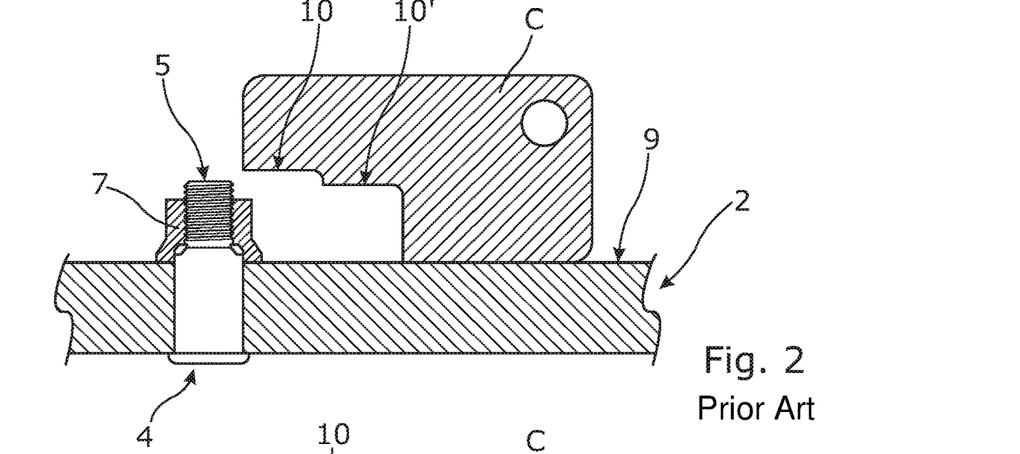
FIGS. 2, 3A, 3B, 4A and 4B, already described, illustrate different prior art methods for inspecting the quality of the assemblies of structural elements of aircraft by using gauges.

FIG. 2 illustrates the inspection method using a metal staircase gauge in the case of an assembly with a screw-nut fixing set without washer. The assembly 2 is of correct quality if, cumulatively, V is greater than Dpeening, that is to say if the edge 10 (first tread of the staircase) of the gauge C cannot pass over the threaded end 5 of the screw with the gauge C bearing on the contact face 9, and if V is less than Dnut, that is to say if the edge 10' (second tread of the staircase) of the gauge is above the threaded end 5 of the screw with the gauge bearing on the contact face 9.

Figure 3A:
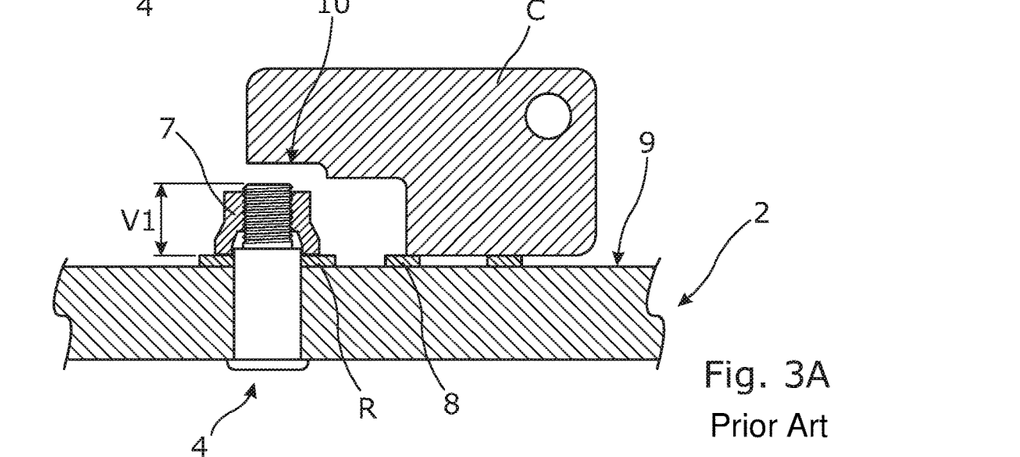
Figure 3B:
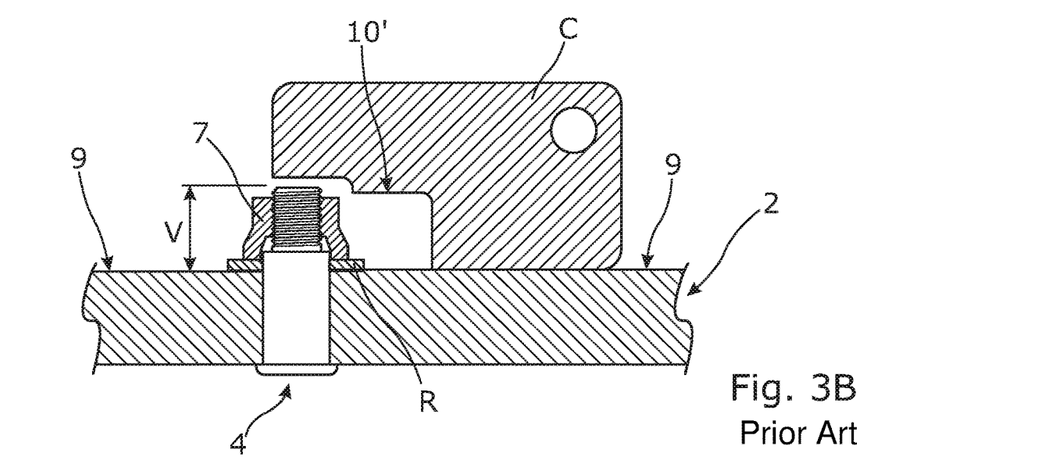

FIGS. 3A and 3B illustrate the inspection method using a metal staircase gauge in the case of an assembly with a screw-nut fixing set with washer. The assembly 2 is of correct quality if, cumulatively, V1 is less than Dnut (FIG. 3A), that is to say if the edge 10 of the gauge C is above the threaded end 5 of the screw with the gauge C bearing on the washer R, and if V is greater than Dpeening (FIG. 3B), that is to say if the edge 10' of the gauge cannot pass over the threaded end 5 of the screw with the gauge bearing on the contact face 9.

Figure 4A:
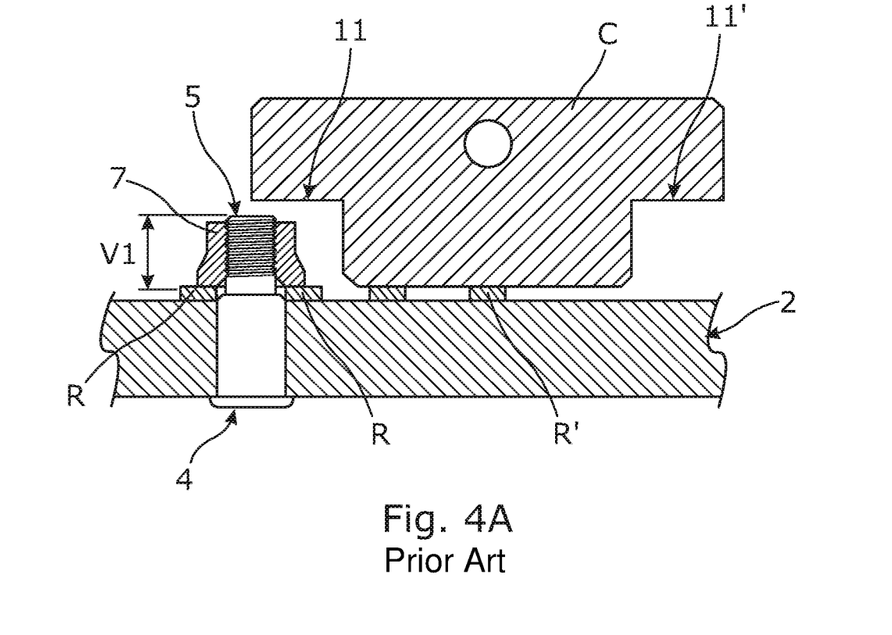
Figure 4B:
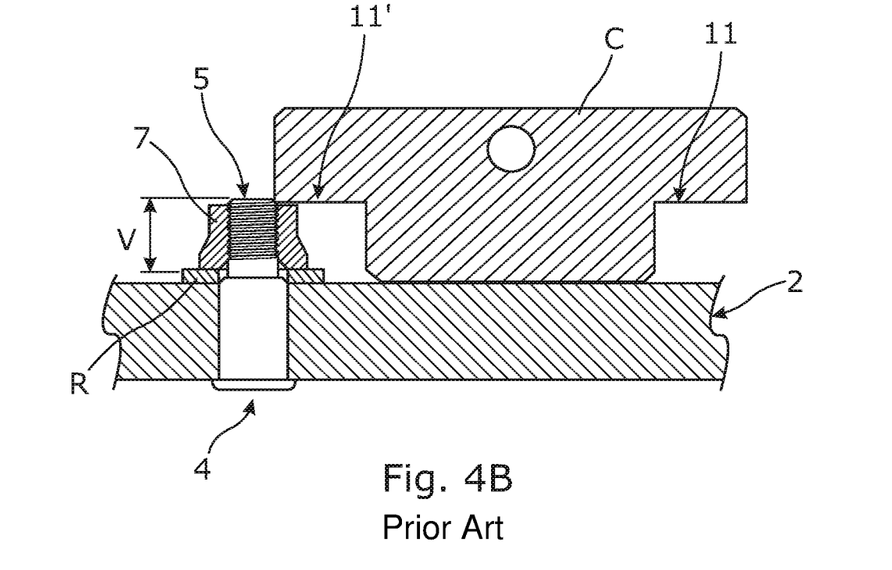

FIGS. 4A and 4B illustrate the inspection method using a metal T-shaped gauge in the case of an assembly with a screw-nut fixing set with washer. The assembly 2 is of correct quality if, cumulatively, V1 is less than Dnut with the gauge C bearing on the washer R (FIG. 4A), Dnut being materialized by the edge 11 of the gauge and if V is greater than Dpeening with the gauge C bearing on the contact face 9 (FIG. 4B), Dpeening being materialized by the edge 11' of the gauge.

The document U.S. Pat. No. 9,057,593 describes another means for checking the conformity of the distances V and V1. In effect, this document describes a tool comprising a mechanical device and an electronic device. The mechanical device comprises a housing comprising a bearing surface configured to be pressed against the contact face 9 of the assembly, a support beam mounted to be translationally mobile inside the housing and comprising a bottom face configured to be pressed against the free end 5 of the screw. A linear encoder measures, in use, a distance between the bearing surface and the bottom face of the mobile support beam in order to rapidly check the conformity of the distances V and V1. Based on the result of the checks carried out, the electronic device provides a rapid readout, via display means, of the quality of the assembly. The inspection tool described in the document U.S. Pat. No. 9,057,593 is efficient, but it is suited only to assemblies of similar characteristics, and, because of this, several inspection tools having different dimensions are necessary in order to be able to inspect the quality of all the assemblies of structural elements 2 of an aircraft.

It will easily be understood that, with such checking means, an operator having to inspect the quality of a multitude of assemblies having different characteristics will need to take some time to go and seek out the correct gauge or the correct mechanical device suited to the characteristics of the assemblies.

SUMMARY OF THE INVENTION

The invention aims to mitigate these drawbacks by providing a tool for inspecting the quality of the assemblies of structural elements of aircraft by means of fixing sets of a screw-nut type. In an embodiment, a tool for inspecting the quality of assemblies of structural elements of an aircraft by means of fixing sets of screw-nut type is provided, the tool comprising a mechanical device and an electronic device connected to one another. The mechanical device comprises a housing comprising a bearing surface defining a reference plane. The surface is configured to, in use, be pressed onto a face, called a contact face, of a structural element of the assembly to be inspected against which the nut screwed onto the screw bears. A support beam is mounted to be translationally mobile inside the housing, the support beam comprising a bottom face configured to, in use, be pressed onto a free end of the screw. A linear encoder is configured to measure, in use, a distance between the reference plane and the bottom face of the mobile support beam. The electronic device comprises a central unit having a database, a display screen and a human-machine interface. The database comprises the characteristics of each of the plurality of the different assemblies of structural elements existing in the aircraft, the characteristics of an assembly comprising at least the dimensions and references of the screw and of the nut of the fixing of screw-nut type, the total thickness of the assembled structural elements and the dimensions and references of a washer inserted between the contact face and the nut in the case where the assembly contains such a washer, a first and a second value recommended for the screw-nut combination of the fixing set in the case where the fixing set does not comprise a washer, and the first and the second value delimiting, respectively, a first and a second range of validity to which the measurement made on the assembly by means of the mechanical device must be compared to inspect the quality of the assembly, and wherein the central unit is configured, in use, to execute a program for implementing a method for inspecting the quality of an assembly of structural elements from the measurement of the distance between the reference plane and the bottom face of the mobile support beam, the program invoking the database.

The invention facilitates the task of the operators in as much as the latter have a single tool with a single usage method regardless of the characteristics of the assembly to be inspected.

BRIEF DESCRIPTION OF THE DRAWINGS

Other details and advantages of the present invention will emerge on reading the following description, which refers to the attached schematic drawings and relates to preferential embodiments, provided by way of nonlimiting examples. In these drawings.

DETAILED DESCRIPTION OF THE PREFERRED EMBODIMENTS

Figure 5:
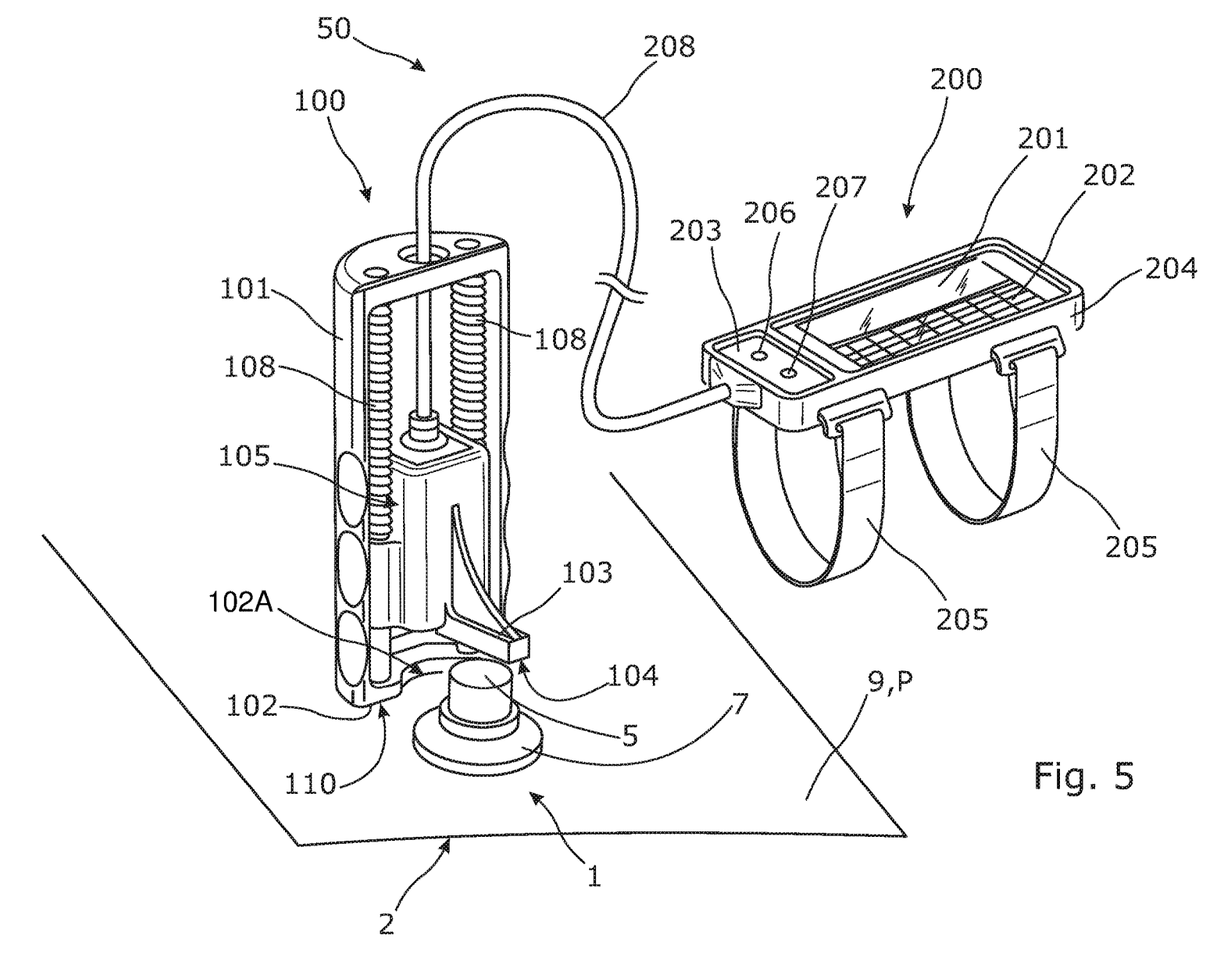
FIG. 5 is a perspective view of a tool for inspecting the quality of the assemblies of structural elements of aircraft by means of fixing sets of screw-nut type according to a first embodiment of the invention.

Referring to FIG. 5, a tool 50 for inspecting the quality of assemblies of structural elements of aircraft 2 by means of fixing sets of screw-nut type 1 comprises, on the one hand, a mechanical device 100 and, on the other hand, an electronic device 200 connected to the mechanical device 100.

The mechanical device 100 comprises a protection housing 101 having a bottom face 102 forming a planar bearing surface 110 which defines a reference plane P and is intended, in use of the tool 50, to be pressed against the contact face 9 of the assembly 2 on which the nut 7 of the fixing set 1 bears. The bottom face 102 has a semi-circular notch 102A to make it possible to place the tool 50 in immediate proximity to an assembly 2 to be inspected, in order to partially surround the nut 7 of the fixing set 1.

The mechanical device 100 incorporates a linear encoder 105 associated with a mobile support beam 103. In the example of FIG. 5, the linear encoder 105 is mounted inside the housing 101 and the support beam comprises a portion extending out of the housing. The support beam 103 is translationally mobile along an axis at right angles (height of the housing) to the bottom face 102. The support beam 103 is returned automatically to a rest position, that is to say, to an end of the housing distal from the bottom face 102, by elastic elements 108 of a spring type.

The mobile support beam 103 has a planar surface 104, arranged on the portion extending out of the housing 101, and intended, in use of the tool 50, to be pressed against the free end 5 of the screw of the fixing set 1.

The linear encoder 105 is configured to provide a measurement of the distance between the bottom face 104 of the portion of the support beam 103 extending out of the housing 101 and the reference plane P (bearing surface 110).

The linear encoder 105 is linked, by a cable 208, to the electronic device 200. In a variant not represented in the figures, the communication between the linear encoder 105 and the electronic device 200 is ensured by wireless transmission/reception means.

The electronic device 200 comprises a central unit (not represented), a display screen 201 and a human-machine interface 202, for example a keyboard. Preferably, the electronic device comprises display means such as, for example, two light indicators 206, 207, respectively green and red.

In the example illustrated, the tool 50 comprises a shell 204 adapted to receive, bear and protect the components of the electronic device 200. The shell 204 comprises straps 205 making it possible to attach it to the forearm of an operator.

Conventionally, the central unit comprises a processor and memories. The central unit implements an operating system, stored in the memories, which, as is known, allows an operator of the tool 50 to interact, via the human-machine interface 202, with the central unit able to control the display of information to the user on the display screen 201.

The operator can start up a program, run by the central unit, making it possible to implement a method for inspecting the quality of an assembly of structural elements of an aircraft by means of the tool 50. The instructions of this program are stored in the memories of the central unit.

According to the invention, the instructions of this program invoke a database stored in the memories and in which are stored the characteristics of each of the plurality of the different assemblies 2 of structural elements existing in the aircraft.

The characteristics of an assembly are the dimensions and references of the screw 4 and of the nut 7, the total thickness (passed through by the screw) of the assembled structural elements, the dimensions and references of the washer if the assembly contains such a washer, the values of Dpeening and Dnut recommended for the screw-nut combination of the fixing set in the case where the fixing set does not comprise a washer, the values of Dpeening and Dnut recommended in the case where the fixing set comprises a washer, optionally the zone of the aircraft in which this assembly is situated.

The zones of the aircraft are defined arbitrarily by the designers of the program as a function of the total thickness of the structural elements passed through by the screw of the fixing set of screw-nut type 1 by means of which the structural elements of the assembly are assembled. The operators of the tool know the distribution of the zones in the aircraft and are thus capable, when they are inside an aircraft, of defining the zone of the aircraft in which the assembly to be inspected is situated.

When an operator launches the program, via the human-machine interface, to implement the method for inspecting the quality of an assembly of structural elements, the following successive steps are implemented.

In an identification step E1, the operator identifies the assembly of structural elements that he wants to inspect. To this end, the central unit triggers the opening of an input window on the display screen 201 and the operator, via the human-machine interface 202 is prompted to enter parameters relating to the characteristics of said assembly. To this end, the operator is prompted to indicate as parameters a dimension or a reference of the screw and of the nut of the fixing set 1 of the assembly, the presence or not of a washer and, if there is one, the dimension or reference of the washer, possibly the zone of the aircraft in which the assembly is situated.

In a determination step E2, the central unit determines, as a function of the parameters entered by the operator, the values of Dpeening and Dnut recommended for the assembly whose quality the operator wants to inspect. In detail, the central unit searches for a match in the database DB between the parameters entered by the operator and an assembly stored in the database and will continue to prompt the operator for parameters until a unique assembly has been determined.

In a positioning step E3, implemented after the operator has received instructions via the display of a window on the display screen 201 to prompt him or her to proceed with a measurement by means of the mechanical device 100, the operator places the mechanical device 100 so as to grip the nut 7 with the bearing surface 110 of the mechanical device 100 pressed against the contact face 9 and the planar surface 104 of the support beam 103 pressed against the free end 5 of the screw.

Preferably, the central unit commands the display screen 201 to display indications concerning how to position the tool 50 to perform this measurement.

In a measurement step E4, the linear encoder 105 measures the distance between the bottom face 104 of the support beam and the reference plane P (bearing surface 110) and supplies this measurement to the central unit.

Then, in a first comparison step E5, the central unit compares the measurement with a first validity range delimited (maximum bound) by the value of Dpeening relating to the peening of the assembly, determined in the determination step E2 and stored in the database.

In a second comparison step E6, the central unit compares the measurement with a second validity range delimited (minimum bound) by the value of Dnut, relating to the complete tightening of the nut 7 on the screw 4, determined in the determination step E2 and stored in the database.

Following the two comparison steps E5 and E6, and in a step E7 of determination of the quality of the assembly, the central unit determines that the quality of the assembly of structural elements 2 is correct if, cumulatively, the measurement lies within the first validity range and within the second validity range or, otherwise, that the quality of the assembly is incorrect if the measurement is outside of at least one of the two validity ranges.

In the case where the quality of the assembly is incorrect, the red light indicator 207 lights up. Provision can be made for this red light to flash or for it to be associated with an audible alarm to more forcefully attract the attention of the user. The operator observing this state will remove the fixing set 1 which will be redone in order to obtain an assembly 2 with a correct quality.

Optionally, the central unit indicates to the operator via the display screen 201 how the quality of the assembly is incorrect and how to proceed to resolve the defect.

On the contrary, if the quality of the assembly is correct, the green indicator 206 lights up and the operator will be able to proceed with the inspection of another assembly.

Preferably, the central unit stores information relating to the inspection of the quality performed in one of the memories for the purposes of traceability of the inspections carried out.

In order to save time, and if the operator has to check several assemblies, at the end of the step E7 of determination of the quality of a first assembly, the central unit triggers the display of a window on the display screen 201 to ask the operator if he wants to proceed:

to inspect the quality of a second assembly of the same characteristics as that already inspected;

to inspect the quality of a second assembly of different characteristics from that already inspected.

In the case a), the method for inspecting the quality of an assembly of structural elements of aircraft will resume at the positioning step E3, implemented after the operator has received instructions via the display of a window on the display screen 201 to prompt him or her to proceed with a measurement by means of the mechanical device 100.

In the case b), the method for inspecting the quality of an assembly of structural elements of aircraft by means of a fixing set of screw-nut type will resume at the identification step E1 in order to identify the new assembly.

The tool 50, according to the invention, is simple and rapid to use and manipulate since the operator has only to enter the characteristics of the assembly via the human-machine interface 202 and perform a single measurement. The impact of the characteristics of the assembly (in particular the presence of the washer) on the measurement is processed electronically and automatically, and the tool 50 provides a simple readout of the quality of the assembly.

In a variant of the invention, not represented in the figures, the electronic device 200 is a touch tablet or a smart phone of the type of those available to the public in which the touch screen of the tablet or of the phone combines the functions of the display device 201, of the human-machine interface 202. An interface element can be used to facilitate the connections of the touch tablet or of the smart phone to the mechanical device 100.

It will be noted that FIGS. 6A to 7B show other possible embodiments of the mechanical device.

In particular, in the embodiments illustrated in these four figures, the mechanical device 100 comprises three feet 106 whose bottom ends form the bearing surface 110 defining the reference plane P. The three feet 106 are dimensioned and spaced apart so as not to interfere with the neighboring assemblies during the inspection of an assembly, and this applies for various zones of the aircraft and various types of assembly to be inspected.

Figure 6A:
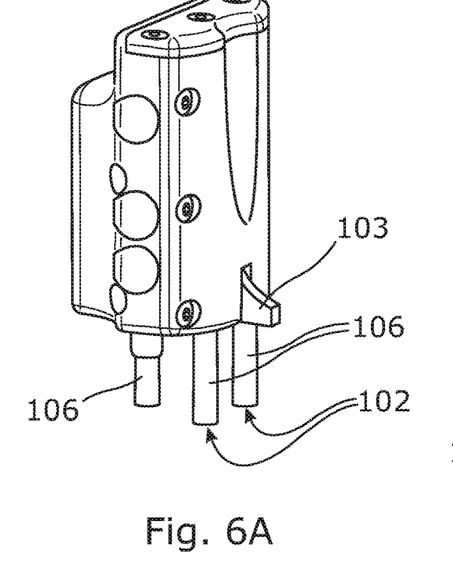
FIG. 6A is a perspective view of an inspection tool according to a second embodiment of the invention.
Figure 6B:
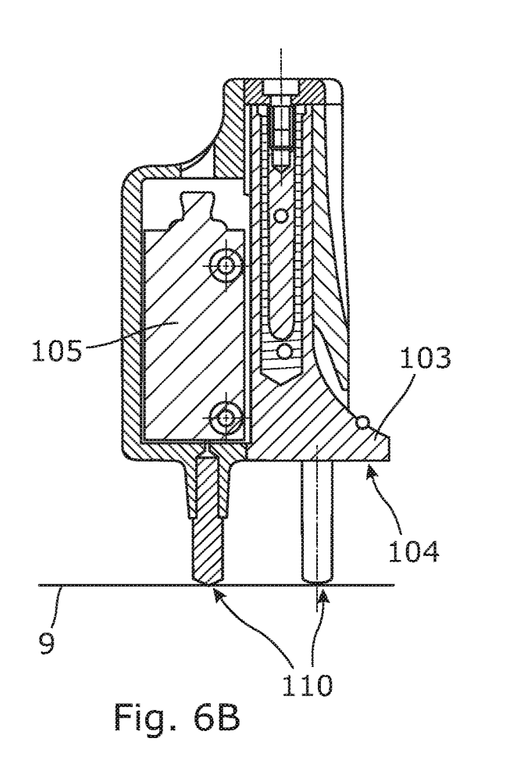
FIG. 6B is a view in axial cross section of the mechanical tool of FIG. 6A.
Figure 7A:
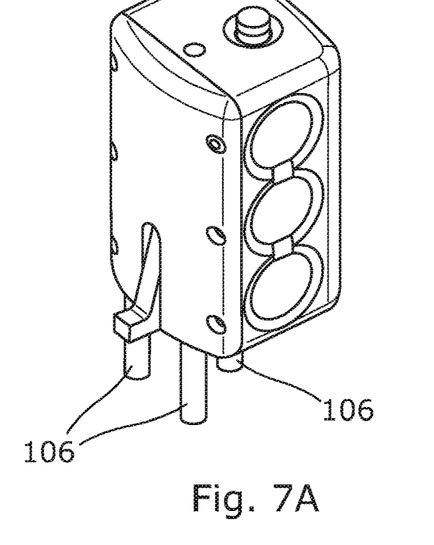
FIG. 7A is a perspective view of an inspection tool according to a third embodiment of the invention.
Figure 7B:
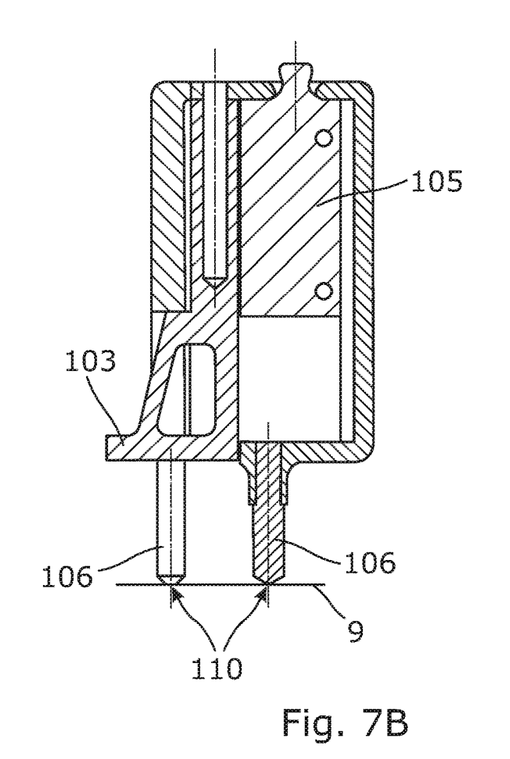
FIG. 7B is a view in axial cross section of the tool of FIG. 7A.

FIGS. 6A and 6B illustrate an embodiment of the mechanical tool in which the sensor of the linear encoder is fixedly mounted inside the tool. FIGS. 7A and 7B illustrate an embodiment of the mechanical tool in which the linear encoder 105 is mounted to be mobile inside the tool 50 and comprises return means, of spring type, for returning the encoder to rest position. In both cases, the support beam 103 is represented in high position.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tool for inspecting a quality of assemblies of structural elements of an aircraft by means of fixing sets, each of which have a nut screwed onto a screw, the tool comprising a mechanical device and an electronic device connected to one another, the mechanical device comprising:
 a housing comprising a bearing surface defining a reference plane, said surface being configured to, in use, be pressed onto a contact face of a structural element of an assembly to be inspected against which the nut screwed onto the screw bears;
 a support beam mounted to be translationally mobile inside the housing, said support beam comprising a bottom face configured to, in use, be pressed onto a free end of the screw;
 a linear encoder configured to measure, in use, a distance between the reference plane and the bottom face of the mobile support beam;

the electronic device comprising:
 a central unit having a database, a display screen and a human-machine interface,
  the database comprising characteristics of each of a plurality of different assemblies of structural elements existing in the aircraft, characteristics of an assembly comprising at least dimensions and references of the screw and of the nut of the fixing set, a total thickness of the assembled structural elements and the dimensions and references of a washer inserted between the contact face and the nut in the case where the assembly contains such a washer, a first and a second value recommended for the screw-nut combination of the fixing set in the case where the fixing set does not comprise a washer,
  and the first and the second value delimiting, respectively, a first and a second range of validity to which the measurement made on the assembly by means of the mechanical device must be compared to inspect the quality of said assembly, and
 wherein the central unit is configured, in use, to execute a program for implementing a method for inspecting the quality of an assembly of structural elements from the measurement of the distance between the reference plane and the bottom face of the mobile support beam, the program invoking the database.

2. The tool according to claim 1, wherein the electronic device is a touch tablet or a smart phone.

3. The tool according to claim 1, further comprising a shell for receiving and protecting the electronic device, and straps fixed to the shell and configured to be placed around a forearm of an operator.

4. The tool according to claim 1, wherein the mechanical device has a planar bottom face forming the bearing surface of the mechanical device.

5. The tool according to claim 1, wherein the mechanical device comprises three feet each having a bottom end, the bottom ends of the three feet forming the bearing surface of the mechanical device.

6. A method for inspecting a quality of an assembly of structural elements of aircraft by means of a fixing set having a nut screwed onto a screw, said method being implemented by means of a tool according to claim 1, comprising the following successive steps:
 an identification step in which an operator identifies the assembly of structural elements that he wants to inspect and enters, via the human-machine interface, parameters relating to characteristics of the assembly;
 a determination step, in which the central unit determines, as a function of the parameters entered by the operator and of data from the database, two values linked to the assembly identified in the preceding step;
 a positioning step, in which the operator places the mechanical device in such a way as to grip the nut of the assembly, with the bearing surface of the mechanical device pressed against the contact face and the planar surface of the support beam pressed against the free end of the screw;

a measurement step, in which the linear encoder measures a distance between the bottom face of the support beam and the reference plane;

a first comparison step, in which the central unit compares the measurement with a first validity range delimited by a first value determined in the determination step;

a second comparison step, in which the central unit compares the measurement with a second validity range delimited by a second value determined in the determination step;

a step of determination of the quality of the assembly, in which the central unit determines that the quality of the assembly is correct if, cumulatively, the measurement lies within the first validity range and within the second validity range or, otherwise, that the quality of the assembly is incorrect if the measurement is outside of at least one of the two validity ranges.

7. The method according to claim 6, wherein the central unit controls an activation of a visual or audible alarm when the inspected quality of the assembly is incorrect.

* * * * *